United States Patent
Stählin

(10) Patent No.: US 9,483,940 B2
(45) Date of Patent: Nov. 1, 2016

(54) METHOD AND SYSTEM FOR ADAPTING THE DRIVING-OFF BEHAVIOR OF A VEHICLE TO A TRAFFIC SIGNAL INSTALLATION, AND USE OF THE SYSTEM

(71) Applicant: Continental Teves AG & Co. oHG, Frankfurt (DE)

(72) Inventor: Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 120 days.

(21) Appl. No.: 14/406,876

(22) PCT Filed: Jun. 14, 2013

(86) PCT No.: PCT/EP2013/062416
§ 371 (c)(1),
(2) Date: Dec. 10, 2014

(87) PCT Pub. No.: WO2013/186379
PCT Pub. Date: Dec. 19, 2013

(65) Prior Publication Data
US 2015/0109147 A1   Apr. 23, 2015

(30) Foreign Application Priority Data
Jun. 14, 2012 (DE) .......... 10 2012 210 069

(51) Int. Cl.
*G08G 1/095* (2006.01)
*G08G 1/017* (2006.01)
(Continued)

(52) U.S. Cl.
CPC ........ *G08G 1/095* (2013.01); *B60W 30/18027* (2013.01); *G08G 1/017* (2013.01);
(Continued)

(58) Field of Classification Search
CPC .............. B60W 2550/22; B60W 2550/408; B60W 30/18027; G08G 1/017; G08G 1/04; G08G 1/095; G08G 1/0967; G08G 1/096716; G08G 1/096725; G08G 1/096758; G08G 1/096783; G08G 1/096791

USPC .......................................................... 340/907
See application file for complete search history.

(56) References Cited

U.S. PATENT DOCUMENTS 8,179,281 B2   5/2012   Strauss
8,331,338 B2   12/2012  Stahlin
(Continued)

FOREIGN PATENT DOCUMENTS

CN   101593431   12/2009
CN   101911144   12/2010
(Continued)

OTHER PUBLICATIONS

German Search Report mailed Jun. 28, 2012 in German Application No. 10 2012 210 069.5.
(Continued)

*Primary Examiner* — Omer S Khan
(74) *Attorney, Agent, or Firm* — RatnerPrestia

(57) ABSTRACT

The invention relates to a method for adapting the driving-off behavior of a vehicle to a traffic signal installation, in which method the traffic signal installation permits passing in a first state and forbids passing in a second state. By means of vehicle-to-X communication means, state information and time information of the traffic signal installation are received by the vehicle and forwarded by the vehicle to a traffic light phase assistance system. Furthermore, the vehicle receives presence information comprising at least position indications from surrounding vehicles that are capable of vehicle-to-X communication. In addition, the position of the vehicle is determined by means of position-determining means. The method is characterized in that the position indications received by means of vehicle-to-X communication are displayed to the driver and the driving-off behavior is adapted in dependence on the state information and the time information and the presence of surrounding vehicles that are not capable of vehicle-to-X communication. The invention further relates to a corresponding system and a use of the system.

11 Claims, 1 Drawing Sheet

(51) Int. Cl.
  *G08G 1/04* (2006.01)
  *G08G 1/0967* (2006.01)
  *B60W 30/18* (2012.01)

(52) U.S. Cl.
  CPC .............. *G08G 1/04* (2013.01); *G08G 1/0967* (2013.01); *G08G 1/096716* (2013.01); *G08G 1/096725* (2013.01); *G08G 1/096758* (2013.01); *G08G 1/096783* (2013.01); *G08G 1/096791* (2013.01); *B60W 2550/22* (2013.01); *B60W 2550/408* (2013.01)

(56) References Cited

U.S. PATENT DOCUMENTS

| | | | |
|---|---|---|---|
| 8,401,758 | B2 | 3/2013 | Stahlin |
| 2007/0046451 | A1* | 3/2007 | Bihya ............... B60R 21/01556 340/438 |
| 2010/0045482 | A1* | 2/2010 | Strauss ................. G08G 1/163 340/903 |
| 2010/0284382 | A1* | 11/2010 | Stahlin ..................... G08G 1/04 370/338 |
| 2011/0098898 | A1* | 4/2011 | Stahlin .................. G08G 1/095 701/70 |
| 2011/0184605 | A1* | 7/2011 | Neff ..................... G05D 1/0255 701/25 |
| 2011/0313609 | A1* | 12/2011 | Endo ............... G08G 1/096716 701/23 |
| 2013/0138320 | A1* | 5/2013 | Aso ....................... B60W 30/16 701/96 |
| 2013/0158852 | A1* | 6/2013 | Stahlin ................. G06K 9/6289 701/301 |
| 2014/0012480 | A1* | 1/2014 | Kagawa ................ B60W 30/16 701/96 |

FOREIGN PATENT DOCUMENTS

| | | |
|---|---|---|
| DE | 102007048809 | 7/2008 |
| DE | 102008035992 | 3/2009 |
| DE | 102008060869 | 6/2009 |
| DE | 102010039418 | 2/2012 |
| EP | 2461303 | 6/2012 |
| WO | 2007097599 | 8/2007 |
| WO | 2011125393 | 10/2011 |
| WO | 2012020293 | 2/2012 |

OTHER PUBLICATIONS

International Search Report for International Application No. PCT/EP2013/062416 mailed Oct. 4, 2013.
Tsugawa, S., "Issues and recent trends in vehicle safety communication systems," IATSS Research, 2005, pp. 1-15, 29(1).
Chinese Office Action for Chinese Application No. 201380031588.0 mailed Oct. 20, 2015, including English translation.
Chinese Office Action for Chinese Application No. 201380031588.0, dated Jul. 7, 2016 with translation, 28 pages.

* cited by examiner

METHOD AND SYSTEM FOR ADAPTING THE DRIVING-OFF BEHAVIOR OF A VEHICLE TO A TRAFFIC SIGNAL INSTALLATION, AND USE OF THE SYSTEM

CROSS REFERENCE TO RELATED APPLICATIONS

This application is the U.S. National Phase Application of PCT International Application No. PCT/EP2013/062416, filed Jun. 14, 2013, which claims priority to German Patent Application No. 10 2012 210 069.5, filed Jun. 14, 2012, the contents of such applications being incorporated by reference herein.

FIELD OF THE INVENTION

The invention relates to a method for adapting a driving-off behavior of a vehicle to a traffic signal installation to a system for adapting a driving-off behavior of a vehicle to a traffic signal installation and to use of the system.

BACKGROUND OF THE INVENTION

Driver assistance systems of various types are known from the prior art; said various types of driver assistance systems often do not serve alone for relieving the driver but also influence the traffic flow to the effect that a steady and uniform driving style is made possible. This not only increases the safety in road traffic but also helps to reduce fuel consumption and therefore the $CO_2$ emissions. In particular in urban areas with increased traffic volume, this can permit more efficient and more environmentally friendly control of the traffic. An example of such a driver assistance system is what is referred to as the traffic light phase assistant which is expected to be implemented as an integral component in all new vehicles as claimed in the current standardization efforts with the introduction of vehicle-to-X communication ("V2X communication") over a large area.

DE 10 2007 048 809 A1, which is incorporated by reference, discloses a method and a device for detecting concealed objects in road traffic. Here, the surroundings of a vehicle are detected by means of sensors and corresponding information is subsequently transmitted to vehicles located in the surroundings by means of an interface for vehicle-to-vehicle communication. The transmitted information is received by the vehicles in the surroundings and used by said vehicles to extend a surroundings model. Furthermore, a situation analysis of the surroundings model which is extended in such a way and an evaluation of the situation of the vehicle in question are carried out.

DE 10 2008 060 869 A1, which is incorporated by reference, describes a method and a device for assisting an operator of a vehicle which is approaching a traffic signal installation. The traffic signal installation has two different operating states, wherein in a first operating state it is permitted to drive over a stop line, and in a second operating state it is not permitted to drive over the stop line. The vehicle receives a signal which describes the current operating state of the traffic signal installation and a time period up to a change in the operating state. On the basis of the received signal, the vehicle checks whether the stop line of the traffic signal installation can be reached at a speed from a predefined speed range while the traffic signal installation is in the first operating state. The speed of the vehicle is influenced or the driver is issued with a recommendation for correspondingly influencing the speed, as a function of the result of the check.

The traffic light phase assistants which are known in the prior art have disadvantages insofar as it is assumed that all the vehicles located in the surroundings, as well as the vehicle in question, are enabled to receive, transmit and process vehicle-to-X messages. However, in reality this is generally not the case. Following vehicles which are following the vehicle equipped with the traffic light phase assistant and which are not enabled for vehicle-to-X communication can therefore often not track the driving-off behavior of the vehicle in front to a traffic signal installation. This can lead to different reactions on the part of the drivers of the following vehicles, ranging from incomprehension to irritation and even aggression.

SUMMARY OF THE INVENTION

An aspect of the present invention therefore proposes a method which improves a known traffic light phase assistant to the effect that following vehicles which are not enabled for vehicle-to-X communication or following vehicles which are not equipped with a traffic light phase assistant are not irritated by the driving-off behavior of a vehicle in front which is equipped with the traffic light phase assistant.

According to the inventive method for adapting a driving-off behavior of a vehicle to a traffic signal installation, in which method the traffic signal installation permits passing in a first state and prohibits passing in a second state, a state information item and a time information item of the traffic signal installation are received by the vehicle by means of vehicle-to-X communication means and passed on to a traffic light phase assistance system. The state information item describes a present state of the traffic signal installation and the time information item describes a time window up to a change in state of the traffic signal installation. Furthermore, presence information comprising at least position data on vehicles in the surroundings which are enabled for vehicle-to-X communication is received by the vehicle. In addition, the vehicle's own position is determined by means of position-determining means. The method is distinguished by the fact that the position data received by means of vehicle-to-X communication is displayed to the driver and the driving-off behavior is adapted as a function of the state information item and the time information item and the presence of vehicles in the surroundings which are not enabled for vehicle-to-X communication. This provides the advantage that the driving-off behavior to the traffic signal installation is not defined exclusively and rigidly as a function of the received state information item and the time information item. Instead, allowance is made, taking into account vehicles in the surroundings which are not enabled for vehicle-to-X communication, during the adaptation of the driving-off behavior of the vehicle for otherwise possibly occurring irritation of the driver of the vehicles in the surroundings which are not enabled for vehicle-to-X communication owing to an unexpected driving-off behavior of the vehicle which is enabled for vehicle-to-X communication. The vehicles in the surroundings which are not enabled for vehicle-to-X communication are detected by the driver from the fact that they are not indicated to him by the vehicle but are nevertheless present. On the basis of the vehicles in the surroundings which are indicated to him and which, under certain circumstances, are additionally perceived by him, the driver can therefore appropriately adapt the driving-off behavior to the traffic signal installation, for example by suitably taking into account the state information item and the time information item.

It is likewise possible and preferred that the driver indicates to the vehicle, by means of an input, for example by activating a pushbutton key or by means of a voice input, the presence of vehicles in the surroundings which are not enabled for vehicle-to-X communication. In this case, the adaptation of the driving-off behavior of the vehicle to the traffic signal installation can be executed automatically by the vehicle because according to the invention the vehicle has all the information necessary for this.

Since, according to current standardization efforts, future new vehicles which are enabled for vehicle-to-X communication will also always be equipped with a traffic light phase assistance system, a particular differentiation between vehicles which are not enabled for vehicle-to-X communication and vehicles which are not equipped with a traffic light phase assistance system is not necessary according to the invention.

The presence information according to the invention is preferably what is referred to as "Cooperative Awareness Messages" (CAM), which are transmitted periodically from every vehicle which is equipped for vehicle-to-X communication and which generally comprise alongside position data of the vehicle an identification information item too and, if appropriate, speed information and orientation information.

In addition to the state information item and the time information item, information about the road geometry as it extends from the vehicle to the traffic signal installation is preferably also transmitted. This information can also be used to adapt the driving-off behavior.

The state information item, the time information item and, if appropriate, the information about the road geometry can be transmitted directly, for example, from the traffic signal installation if the latter has suitable vehicle-to-X communication means. Alternatively, this information can also be made available by a local database which is assigned to the traffic signal installation or by a remote central database by means of suitable communication means.

Traffic signal installations often have not only two different states ("green" and "red"), but three states ("green", "red" and "yellow") which they can assume. The third state ("yellow") usually defines here an intermediate state between the first and the second states. If the traffic signal installation has more than two states, the state information item and the time information item preferably also describe the third state. In this context, the third state can be described alone per se and independently of the first and second states, and it can be described as a component of the first or second states. In the latter case, the state "yellow" would therefore be described, for example, as the state "red".

There is expediently provision that the vehicle can additionally detect, by means of the surroundings sensor system, the position data of the vehicles in the surroundings, and the vehicles in the surroundings are automatically detected as not being enabled for vehicle-to-X communication if their position data is detected exclusively by means of the surroundings sensor system. This results in the advantage that not only the vehicles in the surroundings which are enabled for vehicle-to-X communication or the position data thereof can be indicated to the driver but also the vehicles in the surroundings which are not enabled for vehicle-to-X communication or the position data thereof can be indicated.

This increases the convenience for the driver and assists the driver additionally in the adaptation of the driving-off behavior.

There is preferably provision that a comparatively uniform driving-off behavior is selected if no vehicles in the surroundings which are not enabled for vehicle-to-X communication are detected, and that a comparatively dynamic driving-off behavior is selected if at least one vehicle in the surroundings which is not enabled for vehicle-to-X communication is detected. This results in the advantage that in the case of the presence of only vehicles in the surroundings which are enabled for vehicle-to-X communication, a comparatively environmentally compatible and efficient driving style is made possible since the driving-off behavior can be adapted as far as possible in an optimum way to the states of the traffic signal installation. However, insofar as vehicles in the surroundings which are not enabled for vehicle-to-X communication are also detected, allowance is made for the fact that the drivers of the vehicles in the surroundings which are not enabled for vehicle-to-X communication cannot track a driving-off behavior which is adapted as far as possible in an optimum way to the states of the traffic signal installation, owing to the state information items and time information items which are not known to them. This could bring about different reactions in the drivers of the following vehicles ranging from incomprehension to irritation and even aggression. Selecting a dynamic driving-off behavior means a compromise is made which is compatible both with the states of the traffic signal installation and with the avoidance of possible irritation of the drivers of the vehicles in the surroundings.

The term "uniform driving-off behavior" is understood according to the invention to mean a driving-off behavior with a speed which is as constant as possible, while the term "dynamic driving-off behavior" describes according to the invention a driving-off behavior which changes from a relatively high speed to a relatively low speed as the vehicle increasingly approaches the traffic signal installation, wherein the reduction in the speed particularly preferably becomes more pronounced as the vehicle increasingly approaches the traffic signal installation, and quite particularly preferably said reduction only starts as the vehicle increasingly approaches the traffic signal installation.

In a further preferred embodiment, there is provision that the driving-off behavior is adapted exclusively as a function of vehicles in the surroundings which are following the vehicle, wherein relative positions of the vehicles in the surroundings with respect to the vehicle are determined from the vehicle's own position and the position data. This results in the advantage that the driving-off behavior can be adapted specifically as a function of those vehicles in the surroundings which would be influenced by the driving-off behavior of the vehicle in its own driving behavior. Vehicles in the surroundings which are, for example, driving ahead of the vehicle or are on a different lane are not forced by, under certain circumstances, slow driving off of the vehicle to the traffic signal installation likewise to slow down their speed and therefore do not have to be taken into account in the adaptation of the driving-off behavior.

Vehicles in the surroundings which are driving ahead of the vehicle and which have a lower speed than the vehicle are, however, under certain circumstances always taken into account at least insofar as the driving-off behavior is adapted only to the degree that a rear-end collision with the vehicle in the surroundings which is driving ahead of the vehicle is avoided.

There is expediently provision that it is indicated to a driver of the vehicle whether vehicles in the surroundings which are not enabled for vehicle-to-X communication are detected and, in particular, whether vehicles in the surroundings which are not enabled for vehicle-to-X communication and which are following the vehicle are detected. It is therefore always known to the driver whether and, if appropriate, which vehicles in the surroundings are not enabled for vehicle-to-X communication, and the driver himself can better track the adaptation of the driving-off behavior.

Furthermore it is advantageous that the driving-off behavior is adapted by means of a visual and/or acoustic and/or haptic recommendation to the driver or by means of an autonomous cruise control process. In the former case, the driving-off behavior is therefore controlled by the driver, who is merely issued with a recommendation for the driving-off behavior. As a result, the driver retains complete control over his vehicle. In the latter case, an autonomous cruise control process takes place instead, which contributes to relieving the driver and as a rule permits a comparatively more uniform and controlled driving-off behavior.

There is preferably provision that an intelligent adaptive cruise control system is used for the autonomous cruise control process and/or as a surroundings sensor system. The intelligent adaptive cruise control system (ACC) executes interventions into the control of the engine and brakes and detects the distance from the vehicle in the surroundings which is traveling ahead via a radar sensor and/or infrared sensor and/or mono or stereo camera sensor. Since such systems are often already present on a series-manufactured basis in current vehicles, additional installation expenditure and therefore cost for the autonomous cruise control process or the surroundings sensor system is avoided. However, in particular the surroundings sensor system is preferably supplemented by further surroundings sensors.

The invention also relates to a system for adapting a driving-off behavior of a vehicle to a traffic signal installation, which system comprises a traffic signal installation and vehicles in the surroundings, as well as a vehicle, wherein the vehicle comprises vehicle-to-X communication means and position-determining means and a traffic light phase assistance system. The traffic signal installation permits passing in a first state and prohibits passing in a second state. By means of the vehicle-to-X communication means, the vehicle receives a state information item and a time information item of the traffic signal installation and passes these on to the traffic light phase assistance system, wherein the state information item describes a present state of the traffic signal installation and the time information item describes a time window up to a change in state of the traffic signal installation. Furthermore, the vehicle receives presence information of the vehicles in the surroundings which are enabled for vehicle-to-X communication, comprising at least position data. In addition, the vehicle determines its own position by means of the position-determining means. The system is distinguished in that the display means indicate to the driver the position data received by means of vehicle-to-X communication, and the driving-off behavior is adapted as a function of the state information item and the time information item and the presence of vehicles in the surroundings which are not enabled for vehicle-to-X communication. The system according to the invention therefore comprises all the necessary means for executing the method according to the invention and makes it possible to adapt the driving-off behavior of a vehicle to a traffic signal installation, inter alia as a function of vehicles in the surroundings which are not enabled for vehicle-to-X communication. This results in the advantages already described.

There is expediently provision that the vehicle comprises a surroundings sensor system and additionally detects the position data of the vehicles in the surroundings by means of the surroundings sensor system. This makes it possible also to detect directly the vehicles in the surroundings which are not enabled for vehicle-to-X communication and to indicate them to the driver. This increases the convenience for the driver and helps to relieve said driver further.

Furthermore it is advantageous that the vehicle-to-X communication means transmits and/or receives information on the basis of one or more connection classes from the group:
 WLAN connection, in particular in accordance with IEEE 802.11,
 ISM connection (Industrial, Scientific, Medical Band),
 Bluetooth® connection,
 ZigBee connection,
 UWB (Ultra-Wide Band) connection,
 WiMax® (Worldwide Interoperability for Microwave Access) connection,
 infrared connection and
 mobile radio connection.

These connection classes of the vehicle-to-X communication means entail different advantages and disadvantages here. WLAN connections permit, for example, a high data transmission rate and a high-speed connection set-up. On the other hand, ISM connections provide only a relatively low data transmission rate, but are comparatively well suited for transmitting data around obstructions to the view. Infrared connections again likewise provide a low data transmission rate. Finally, mobile radio connections are not adversely affected by obstructions to the view and additionally provide a good data transmission rate. However, on the other hand their connection set-up is comparatively slow. The combination and simultaneous or parallel use of a plurality of these connection classes results in further advantages since in this way the disadvantages of individual connection classes can be compensated.

Furthermore it is advantageous that the surroundings sensor system detects position data on the basis of one or more sensor classes from the group:
 radar sensor,
 optical camera sensor,
 lidar sensor,
 laser sensor and
 ultrasonic sensor.

The specified sensor classes are sensors which are typically used in the field of motor vehicles and which permit essentially comprehensive detection and sensing of the surroundings of the vehicle. At the present time, a large number of vehicles are already equipped with a plurality of sensors of the specified sensor classes on a standard basis and this number is expected to increase further in the future. The additional installation expenditure and cost involved in implementing the method according to the invention in a motor vehicle are therefore low.

There is preferably provision that the system executes the method according to the invention.

The invention furthermore relates to use of the system according to the invention in a vehicle.

BRIEF DESCRIPTION OF THE DRAWINGS

Further preferred embodiments can be found in the dependent claims and the following descriptions of exemplary embodiments with reference to figures, of which:

DETAILED DESCRIPTION OF THE PREFERRED EMBODIMENTS

Figure 1:
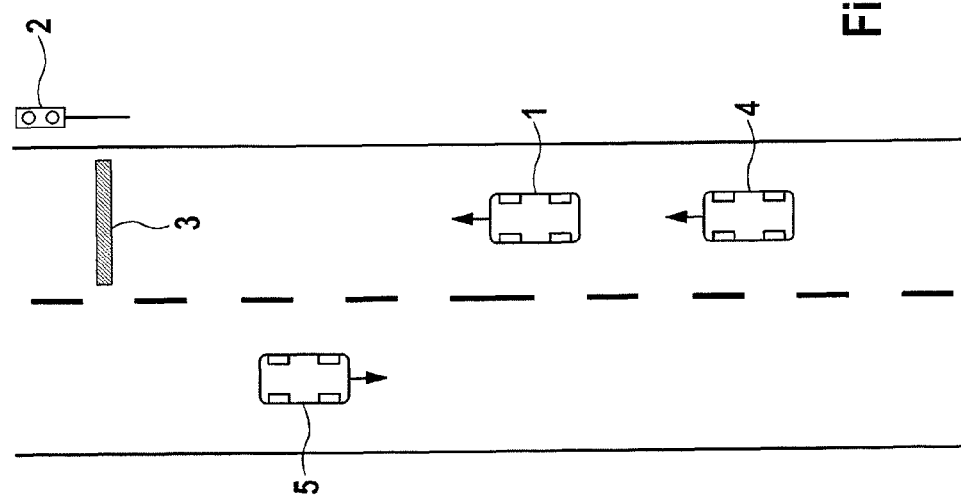
FIG. 1 is a schematic view of a traffic situation in which a vehicle is approaching a traffic signal installation.

FIG. 1 shows the vehicle 1 which is equipped with the system according to the invention for adapting a driving-off behavior of a vehicle to a traffic signal installation 2. The traffic signal installation 2 is currently in the state "red" which prohibits the vehicle 1 from passing through the traffic signal installation 2. The traffic signal installation 2 is assigned a stop line 3 which describes the stopping point for vehicles approaching the traffic signal installation 2 if the traffic signal installation 2 is in the state "red". The vehicle 1 receives a state information item and a time information item from the traffic signal installation 2 and makes this information available to a vehicle-side traffic light phase assistance system. The traffic light phase assistance system evaluates the state information item and the time information item and detects that a change in state of the traffic signal installation 2 into the state "green" is immediately imminent and it will be possible to pass the stop line 3 without the vehicle stopping if the vehicle 1 adapts its driving-off behavior to the effect that the current speed is reduced. Furthermore, vehicle 4 is detected by means of a radar sensor which is arranged at the rear of the vehicle 1. Since no presence information is received by vehicle 4 by means of vehicle-to-X communication, it is detected that the vehicle 4 is not enabled for vehicle-to-X communication and therefore does not know the time information item of the traffic signal installation 2. Since the driver of the vehicle 4 has a clear view of a traffic signal installation 2, he knows, however, the current state of the traffic signal installation 2. Early slowing down of the vehicle 1 would cause the driver of the vehicle 4 to be irritated since he could not necessarily track the driving-off behavior of the vehicle 1 to the traffic signal installation 2 owing to the time information item which is unknown to him. Furthermore, by means of a camera sensor, vehicle 5 senses which vehicle 1 is approaching on the oncoming carriageway. In addition, a presence information item is received by the vehicle 5, on the basis of which it is detected that the vehicle 5 is enabled for vehicle-to-X communication. However, since a vehicle 5 is located on the oncoming carriageway and furthermore is enabled for vehicle-to-X communication, the vehicle 5 is not taken into account further for the adaptation of the driving-off behavior of vehicle 1 to the traffic signal installation 2. Correspondingly, a dynamic driving-off recommendation is output via a visual display to the driver of vehicle 1 while taking into account both the received state information item and the time information item as well as the presence of the vehicle 4 which is not enabled for vehicle-to-X communication. The dynamic driving-off recommendation provides approaching the traffic signal installation 2 at a slowly decreasing speed in order therefore to permit passing through the traffic signal installation 2 in the "green" state and at the same time to avoid the driver of vehicle 4 becoming irritated by the driving-off behavior of vehicle 1.

Figure 2:
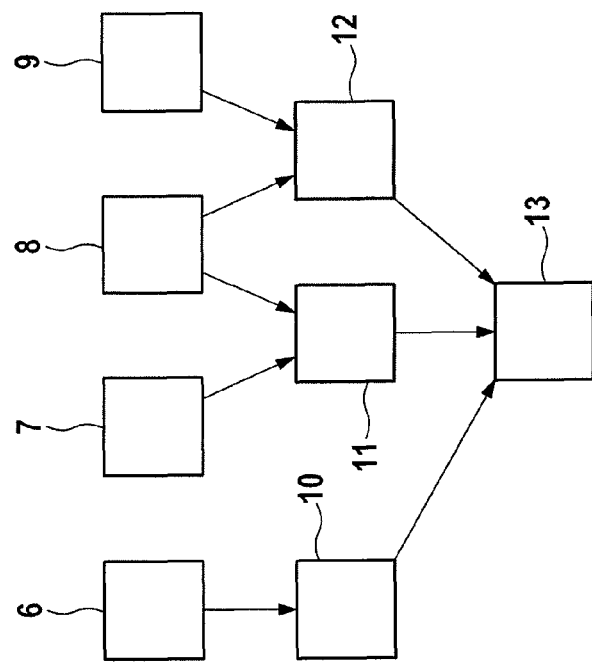
FIG. 2 shows a flowchart with a possible sequence of the method according to the invention.

FIG. 2 shows a flowchart with an exemplary sequence of the method according to the invention for adapting a driving-off behavior of a vehicle to a traffic signal installation. In the method step 6, a state information item and a time information item of the traffic signal installation are received by a vehicle by means of vehicle-to-X communication means. At the same time, in step 7 the vehicle's own position is determined by means of position-determining means in the form of a GPS receiver, in step 8 position data on vehicles in the surroundings is detected by means of a surroundings sensor system, and chronologically and parallel to this in method step 9 the vehicle also receives presence information on vehicles in the surroundings which are enabled for vehicle-to-X communication, by means of the vehicle-to-X communication means. The presence information comprises here in each case a position data item on that vehicle in the surroundings from which the information is transmitted. In method step 10, the state information item and the time information item are passed on to a traffic light assistance system and processed thereby. In method step 12 it is detected, on the basis of the position data included in the presence information and the position data detected by means of the surroundings sensor system, which of the vehicles in the surroundings are not enabled for vehicle-to-X communication in that the positions of the vehicles in the surroundings which are not enabled for vehicle-to-X communication are detected exclusively by means of a surroundings sensor system. In step 11, a relative position of the vehicles in the surroundings with respect to the vehicle is determined from the vehicle's own specific position and the position data detected by means of the surroundings sensor system. Finally, in method step 13 the driving-off behavior of the vehicle is adapted to the traffic signal installation taking into account the state information item, the time information item and the vehicles in the surroundings which follow the vehicle and which are not enabled for vehicle-to-X communication.

The invention claimed is:

1. A method for adapting a driving-off behavior of a vehicle to a traffic signal installation,
   in which the traffic signal installation permits passing in a first state and prohibits passing in a second state,
   in which a state information item and a time information item of the traffic signal installation are received by the vehicle by vehicle-to-X communication means and are passed on to a traffic light phase assistance system,
   wherein the state information item describes a present state of the traffic signal installation and the time information item describes a time window up to a change in state of the traffic signal installation,
   in which presence information comprising at least position data on vehicles in the surroundings which are enabled for vehicle-to-X communication is also received by the vehicle, and
   in which the vehicle determines its own position by position-determining means, wherein
   the position data received by vehicle-to-X communication are displayed to the driver and the driving-off behavior is adapted as a function of the state information item and the time information item and the presence of vehicles in the surroundings which are not enabled for vehicle-to-X communication, and
   the vehicle additionally detects the position data on the vehicles in the surroundings by a surroundings sensor system, and the vehicles in the surroundings are automatically detected as not being enabled for vehicle-to-X communication if the surrounding vehicles position data is detected exclusively by the surroundings sensor system.

2. The method as claimed in claim 1, wherein
   a comparatively uniform driving-off behavior is selected if no vehicles in the surroundings which are not enabled for vehicle-to-X communication are detected, and in that a comparatively dynamic driving-off behavior is selected if at least one vehicle in the surroundings which is not enabled for vehicle-to-X communication is detected.

3. The method as claimed in claim 1, wherein
the driving-off behavior is adapted exclusively as a function of vehicles in the surroundings which are following the vehicle, and
wherein relative positions of the vehicles in the surroundings with respect to the vehicle are determined from the vehicle's own position and the position data.

4. The method as claimed in claim 1, wherein
it is indicated to a driver of the vehicle whether vehicles in the surroundings which are not enabled for vehicle-to-X communication are detected and, whether vehicles in the surroundings which are not enabled for vehicle-to-X communication and which are following the vehicle are detected.

5. The method as claimed in claim 1, wherein
the driving-off behavior is adapted by a visual and/or acoustic and/or haptic recommendation to the driver or by means of an autonomous cruise control process.

6. The method as claimed in claim 5, wherein
an intelligent adaptive cruise control system is used for the autonomous cruise control process and/or as a surroundings sensor system.

7. A system for adapting a driving-off behavior of a vehicle to a traffic signal installation, comprising a traffic signal installation and vehicles in the surroundings as well as the vehicle,
wherein the vehicle comprises vehicle-to-X communication means and position-determining means and display means and a traffic light phase assistance system,
wherein the traffic signal installation permits passing in a first state and prohibits passing in a second state,
wherein the vehicle receives a state information item and a time information item of the traffic signal installation by the vehicle-to-X communication means and passes them on to the traffic light phase assistance system,
wherein the state information item describes a present state of the traffic signal installation and the time information item describes a time window up to a change in state of the traffic signal installation,
wherein the vehicle also receives presence information of the vehicles in the surroundings which are enabled for vehicle-to-X communication, comprising at least position data, and
wherein the vehicle determines its own position by means of the position-determining means, wherein
the display means indicate to the driver the position data received by vehicle-to-X communication, and the driving-off behavior is adapted as a function of the state information item and the time information item and the presence of vehicles in the surroundings which are not enabled for vehicle-to-X communication, and
the vehicle additionally detects the position data on the vehicles in the surroundings by a surroundings sensor system, and the vehicles in the surroundings are automatically detected as not being enabled for vehicle-to-X communication if the surrounding vehicles position data is detected exclusively by the surroundings sensor system.

8. The system as claimed in claim 7, wherein
the vehicle comprises a surroundings sensor system and additionally detects the position data of the vehicles in the surroundings by means of the surroundings sensor system.

9. The system as claimed in claim 7, wherein
the vehicle-to-X communication means transmits and/or receives information on the basis of one or more connection classes selected from the group consisting of:
a WLAN connection, in accordance with IEEE 802.11,
an ISM connection (Industrial, Scientific, Medical Band),
a Bluetooth® connection,
a ZigBee connection,
a UWB (Ultra-Wide Band) connection,
a WiMax® (Worldwide Interoperability for Microwave Access) connection,
an infrared connection and
a mobile radio connection.

10. The system as claimed in claim 7, wherein
the surroundings sensor system detects position data on the basis of one or more sensor classes selected from the group consisting of:
a radar sensor,
an optical camera sensor,
a lidar sensor,
a laser sensor and
an ultrasonic sensor.

11. Use of a system in a vehicle for adapting a driving-off behavior of the vehicle to a traffic signal installation, comprising a traffic signal installation and vehicles in the surroundings as well as the vehicle,
wherein the vehicle comprises vehicle-to-X communication means and position-determining means and display means and a traffic light phase assistance system,
wherein the traffic signal installation permits passing in a first state and prohibits passing in a second state,
wherein the vehicle receives a state information item and a time information item of the traffic signal installation by the vehicle-to-X communication means and passes them on to the traffic light phase assistance system,
wherein the state information item describes a present state of the traffic signal installation and the time information item describes a time window up to a change in state of the traffic signal installation,
wherein the vehicle also receives presence information of the vehicles in the surroundings which are enabled for vehicle-to-X communication, comprising at least position data, and
wherein the vehicle determines its own position by means of the position-determining means,
wherein the display means indicate to the driver the position data received by vehicle-to-X communication, and the driving-off behavior is adapted as a function of the state information item and the time information item and the presence of vehicles in the surroundings which are not enabled for vehicle-to-X communication, and
wherein the vehicle additionally detects the position data on the vehicles in the surroundings by a surroundings sensor system, and the vehicles in the surroundings are automatically detected as not being enabled for vehicle-to-X communication if the surrounding vehicles position data is detected exclusively by the surroundings sensor system.

* * * * *